United States Patent [19]

Reiter

[11] Patent Number: 4,487,534
[45] Date of Patent: Dec. 11, 1984

[54] POLYGONAL CUTTING BIT

[75] Inventor: Norbert Reiter, Mettmann, Fed. Rep. of Germany

[73] Assignee: Fried. Krupp Gesellschaft mit beschränkter Haftung, Essen, Fed. Rep. of Germany

[21] Appl. No.: 432,373

[22] Filed: Sep. 30, 1982

[30] Foreign Application Priority Data

Dec. 8, 1981 [DE] Fed. Rep. of Germany ....... 3148535

[51] Int. Cl.³ .............................................. B26D 1/00
[52] U.S. Cl. .................................................. 407/114
[58] Field of Search ........................ 407/114, 115, 116

[56] References Cited

U.S. PATENT DOCUMENTS

| 3,395,434 | 8/1968 | Wirfelt | 29/95 |
| 3,792,514 | 2/1974 | Ushijima | 29/95 R |
| 3,815,192 | 6/1974 | Ohtsuka | 407/114 |
| 4,189,265 | 2/1980 | Arnold et al. | 407/114 |
| 4,214,845 | 7/1980 | Mori | 407/114 |
| 4,359,300 | 11/1982 | Hazra et al. | 407/114 |

FOREIGN PATENT DOCUMENTS

| 1602967 | 8/1971 | Fed. Rep. of Germany . |
| 2231631 | 2/1973 | Fed. Rep. of Germany . |
| 2309443 | 9/1973 | Fed. Rep. of Germany . |
| 2940328 | 4/1980 | Fed. Rep. of Germany . |
| 2306770 | 11/1976 | France ................. 407/114 |

Primary Examiner—Leonidas Vlachos
Attorney, Agent, or Firm—Spencer & Frank

[57] ABSTRACT

In order to reliably shape and remove the cut chip under different cutting conditions a polygonal cutting bit is proposed for cutting tools having raised chip forming elements wherein the chip forming elements are given essentially the shape of a pyramid frustum. Advantageously the pyramid frustum forming the chip forming element has a triangular shape with concavely extending side faces and/or rounded corners. The chip forming elements are possibly disposed in chip forming grooves which again are of a concave or stepped design and are at least in part face ground and no higher than the cover face of the cutting bit.

14 Claims, 14 Drawing Figures

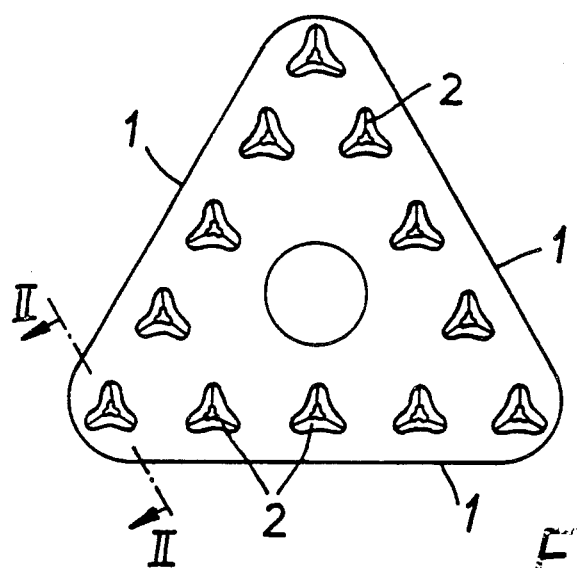
FIG. 1
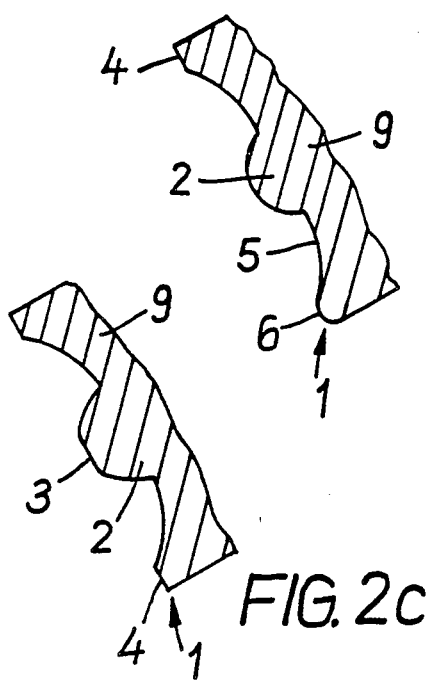
FIG. 2a
FIG. 2c
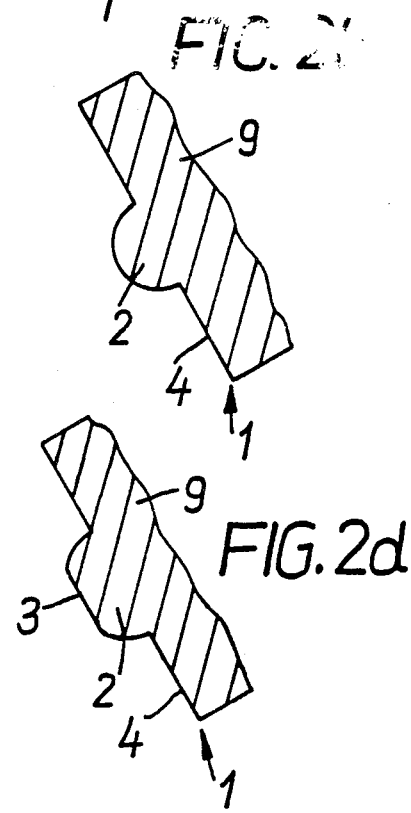
FIG. 2b
FIG. 2d

POLYGONAL CUTTING BIT

BACKGROUND OF THE INVENTION

The present invention relates to a polygonal cutting bit for cutting tools for machining work, the bit being of the type provided with raised chip forming elements.

In prior art cutting bits of this type, chip breaker grooves are formed along the cutting edge in which, for example according to a proposal made in German Pat. No. 2,309,443, chip breaker projections are provided in the form of a plurality of spaced juxtaposed spherical segments.

The chip breaking capability and the working strength of the above-described cutting bit are not necessarily satisfactory.

Accordingly in the U.S. Pat. No. 4,214,845 throw away inserts have been proposed, which have hemispherical chip breaking projection means extending from each of said cutting edges downwardly towards the center of at least one of the major surfaces of the insert body.

However, it has been found in practice that the above-described cutting bits can be used only within limits for different cutting conditions such as different cutting depths, feed rates and cutting rates, and for certain materials. In the course of industrial development and particularly due to increased automatization, it has become necessary, however, to have the most universally employable cutting bits for which the reliable shaping and removal of chips from the machine is a primary prerequisite for continuous operation.

SUMMARY OF THE INVENTION

It is therefore an object of the present invention to provide a cutting bit which, at the same time, provides for reliable shaping and removal of the cut chips over a wide range of applications under different cutting conditions and assures that chips can be broken which not only have different thicknesses but also are made from different materials.

The above and other objects are achieved according to the invention by a novel polygonal cutting bit which generally has triangular or quadrilateral cover faces and chip forming elements embedded therein, with each chip forming element having essentially the form of a pyramid frustum preferably with a triangular base face.

However, the chip forming elements need not have a strictly triangular shape. Rather, according to a further feature of the invention, frustopyramid shaped chip forming elements are used which have rounded concave side faces and/or rounded corners so that they have, for example, a trifurcated form with concavely shaped side faces, or the form of a star with rounded corners. The described configuration permits the respectively best adaptation of the chip forming elements to the outer contour of the cutting bit so that the desired chip shape is assured down to the smallest cutting depth. Preferably, the chip forming elements are arranged in such a manner that their base face boundary lines extend generally parallel to the cutting edges.

It has moreover been found to be advantageous to embed the chip forming elements in chip forming grooves which are of a concave or stepped design.

Particularly for cutting bits which can be used from two sides, it is recommended to at least partially plane grind the chip forming elements, specifically in such a manner that the planar face of each chip forming elements disposed parallel to the covering face of the cutting bit and that covering face are at the same height.

According to a further embodiment of the invention, chip forming elements of different sizes and different geometries, i.e. pyramid frustum shapes, some with acute angle edges and some with rounded edges, can be used in the cutting bit.

Embodiments of the invention are illustrated in the drawings.

BRIEF DESCRIPTION OF THE DRAWING

FIG. 1 is a top plan view of an embodiment of a cutting bit according to the invention.

FIGS. 2a through 2d are cross-sectional, detail views, along the line II—II of FIG. 1, of different forms of construction of the chip forming elements and associated bit cover face.

DESCRIPTION OF THE PREFERRED EMBODIMENTS

Figure 3:
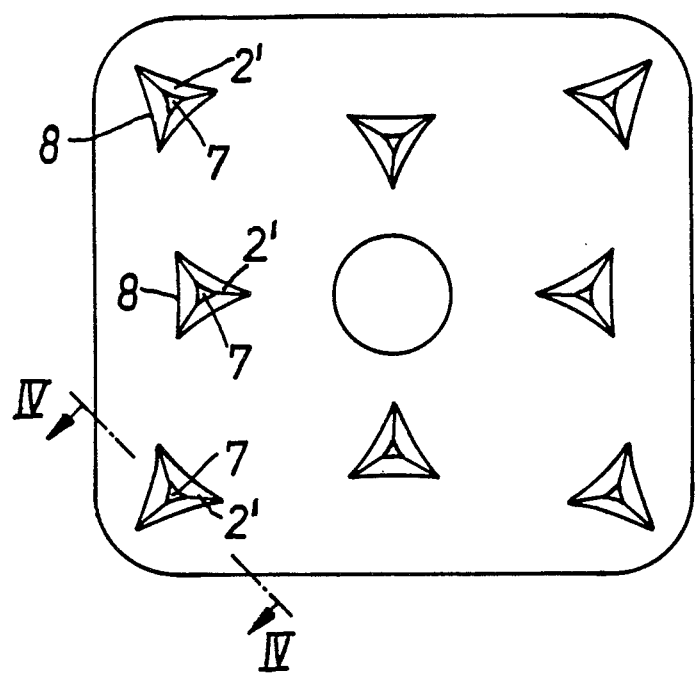
FIG. 3 is a top plan view of an embodiment of a qualrilateral cutting bit according to the invention.

The cutting bit shown in FIG. 1 has an essentially regular triangular shape, i.e. triangular top and bottom cover faces, and is provided with chip forming elements 2, which have an essentially star-shaped outline in the illustrated embodiment. Elements 2 are disposed alongside the cutting edges 1, which are constituted by the lines of intersection between the illustrated cover face and the respective side faces which extend substantially normally to the cover faces.

Further possibilities for shaping the chip forming elements 2 are shown in FIGS. 2a through 2d, 8 and 9 according to which the chip forming elements have a cross section in the form of a circular segment or a semicircle, possibly with a face ground surface 3.

According to the embodiments shown in FIGS. 2b and 2d, the chip forming elements may be arranged on the planar covering face 4, or, as in the embodiments of FIGS. 2a and 2c, in depressions in the form of chip forming grooves, or recesses, 5. The chip forming grooves may have different shapes, asymmetrical arrangements as in FIG. 2a, or symmetrical arrangements as in FIG. 2c, being possible. Moreover, the depth and radius of the chip forming grooves may be adapted to the cutting requirements.

It has also been found to be of advantage to place the cutting edges 1 at a higher elevation than the main part of the covering face 4 of the cutting bit, or than the chip form grooves, by giving the covering face a slight downward slope toward the center of the cutting bit or a tongue-shaped corner projection 6 is provided, as shown in FIG. 2a.

Figure 4A:
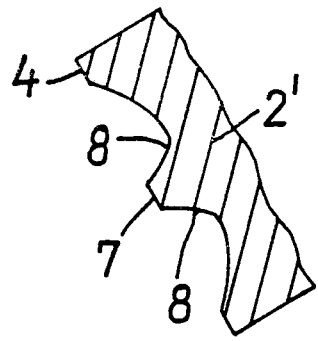
FIGS. 4a through 4c are cross-sectional, detail views, along the line IV–IV of FIG. 3, of different forms of construction of the chip forming elements and associated bit cover face.
Figure 4B:
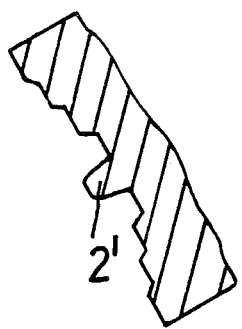
Figure 4C:
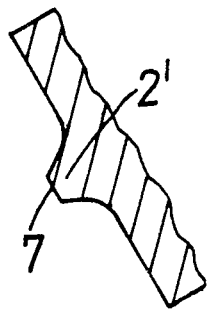

In contrast, the quadrilateral, e.g. rectangular, cutting bit shown in FIG. 3 has trifurcate chip forming elements 2' which possibly are provided, as shown in FIG. 4a and FIG. 4c, with face ground end faces 7. The side faces 8 of the chip forming elements 2' are given a concave curvature, as shown in FIG. 4a, or a stepped design, as shown in FIG. 4b.

If the chip forming elements are embedded in a depression type chip forming groove 5, it is recommended, particularly with cutting bits that can be used on both sides, i.e. the borders of both cover faces are used as cutting edges, to limit the height of the chip forming elements in such a way that their tips (FIG. 4b), or their faces 7 (FIG. 4a) arranged parallel to the cover face 4, are at most at the same height as the portions of face 4 which surround the grooves, or recesses.

The chip forming elements need not inevitably be arranged on lines parallel to the cutting edges. Sometimes it can be just as advantageous to arrange the chip forming elements along the cutting edge on curved lines having a large radius, as shown in FIG. 3.

Figure 5:
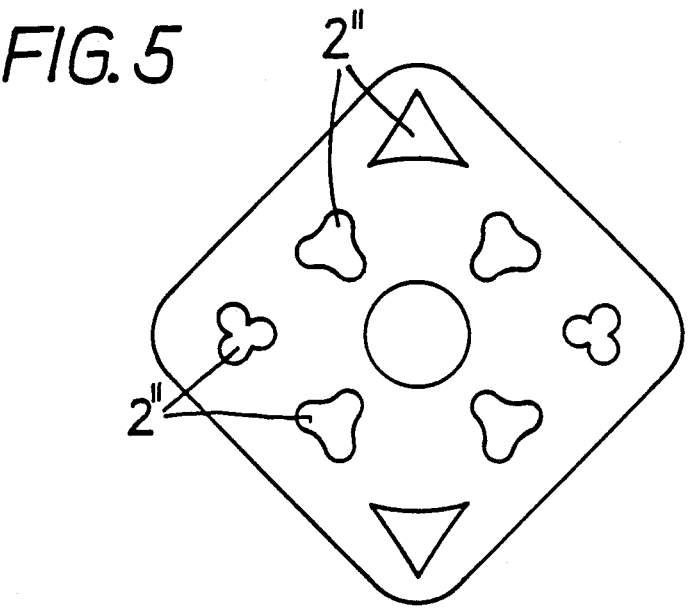
FIG. 5 is a top plan view of an embodiment of a square cutting bit with rounded edges and a plurality of different chip forming element configuration.

FIG. 5 shows a square cutting bit equipped with chip forming elements 2" of various forms. The shapes employed go from the trifurcate to the star-shaped to the almost spherical cone frustum design.

Figure 6:
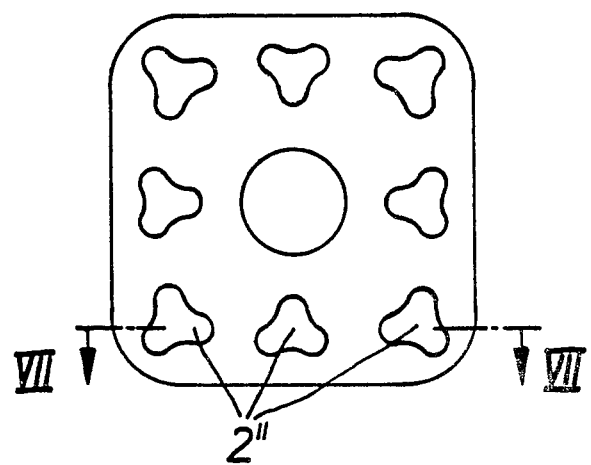
FIG. 6 is a top plan view of a further embodiment of a cutting bit according to the invention.
Figure 7:
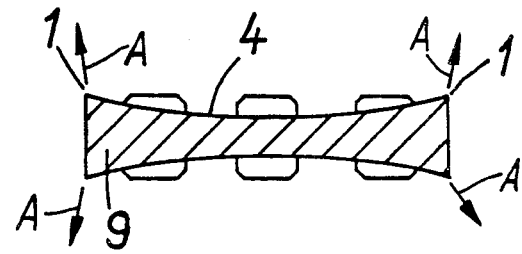
FIG. 7 is a cross-sectional view along the line VII—VII of FIG. 6.
Figure 8:
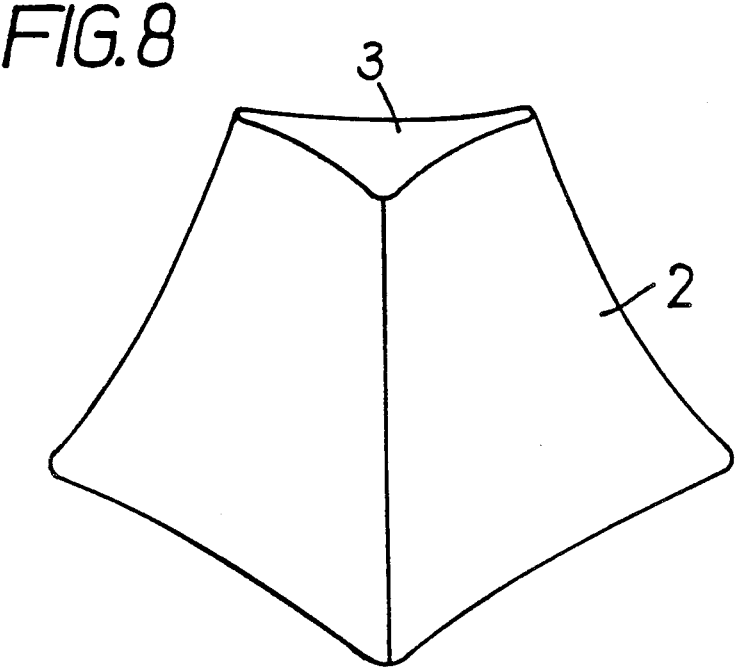
FIG. 8 is a perspective view of a chip forming element with a face ground surface.
Figure 9:
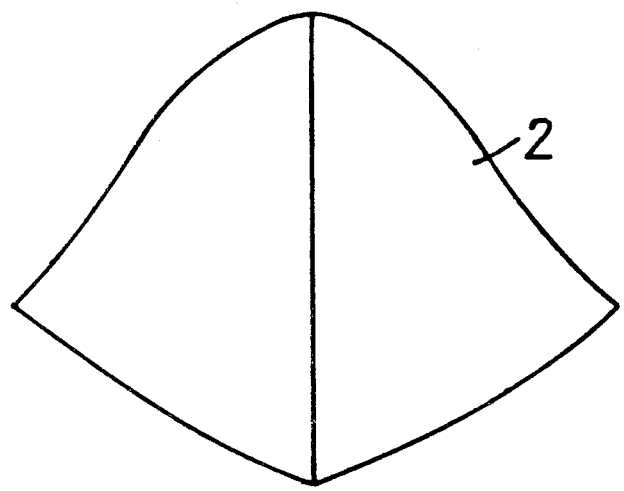
FIG. 9 is a perspective view of a chip forming element with a rounded tip.

FIGS. 6 and 7 show a cutting bit that can be used from both sides and has three star-shaped chip forming elements 2" arranged on each cutting edge. Each cover face 4 of the cutting bit is given a depression shape underside, as shown in FIG. 7, so that the basic cutting bit body 9 resembles a concave lens.

The chip forming elements can be applied to the basic body 9 of the cutting bit by sintering, soldering, gluing or the like.

The arrows A in FIG. 7 illustrate four of the possible cutting directions of the bit, these being associated with the cutting edges 1 extending perpendicular to the plane of the Figure. Four similar cutting directions are associated with the cutting edges that extend parallel to the plane of FIG. 7.

The hard metal cutting bits and chip forming elements contain at least one hard metal refractory carbide of at least one of the elements titanium, zirconium, hafnium, vanadium, niobium, tantalum, chromium, molybdenum and tungsten, preferably 80% tungsten monocarbide, 13% titanium carbide and tantalum carbide and 7% cobald.

The smallest cutting bits are in general 4.35 mm, the greatest ones 35 mm, so that the dimensions of chip forming elements are from 0.5 mm up to 5 mm.

It will be understood that the above description of the present invention is susceptible to various modifications, changes and adaptations, and the same are intended to be comprehended within the meaning and range of equivalents of the appended claims.

What is claimed is:

1. A cutting bit for cutting tools used for chip forming work, said bit comprising a polygonal cover face; cutting edges surrounding said cover face; and a plurality of chip forming elements arranged in rows, wherein each said row is spaced a distance from a respectively adjacent cutting edge, each said element has a base face which is joined to said cover face and a cross-section parallel to said base face which becomes smaller as the plane of the cross-section is moved away from said base face, and each said base face has three corners, one of said corners being oriented toward the internal region of said cover face while a line connecting the other two corners lies between the adjacent cutting edge and said one corner.

2. Cutting bit as defined in claim 1 wherein said other corners of each said base face have the same distance from the adjacent cutting edge.

3. Cutting bit as defined in claim 1 wherein said other corners of each said base face are disposed on a curved line.

4. Cutting bit as defined in claim 1 wherein the base face of at least one said chip forming element is designed in the form of a triangle.

5. Cutting bit as defined in claim 1 wherein the base face of at least one said chip forming element is defined by rounded concave lines which connect the corners of that base face.

6. Cutting bit as defined in claim 1 wherein the corners of each said base face are rounded.

7. Cutting bit as defined in claim 1 wherein said chip forming elements each have a planar surface at their end remote from said base surface.

8. Cutting bit as defined in claim 7 where the planar surfaces of all said chip forming elements lie in a common plane.

9. Cutting bit as defined in claim 8 wherein said cover face is designed in the form of a trough and the common plane defined by the ends of said chip forming elements is not higher than the plane defined by the cutting edges.

10. Cutting bit as defined in claim 1 wherein said chip forming elements each have an end remote from its base surface which is rounded.

11. Cutting bit as defined in claim 1 wherein said cover face is provided with a plurality of recesses each containing a respective chip forming element.

12. Cutting bit as defined in claim 11 wherein each said recess has a concave form.

13. Cutting bit as defined in claim 11 wherein each said recess has a stepped form.

14. Cutting bit as defined in claim 11 wherein each said chip forming element is at least partly face ground at its peak and projects no higher than said cover face.

* * * * *